(12) United States Patent
Van Bogaert

(10) Patent No.: US 10,053,291 B1
(45) Date of Patent: *Aug. 21, 2018

(54) MODULAR CHUTE SYSTEM

(71) Applicant: John Peter Van Bogaert, Tucson, AZ (US)

(72) Inventor: John Peter Van Bogaert, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/803,577

(22) Filed: Nov. 3, 2017

Related U.S. Application Data

(63) Continuation-in-part of application No. 15/364,894, filed on Nov. 30, 2016, now Pat. No. 9,809,385, which is a continuation-in-part of application No. 15/083,052, filed on Mar. 28, 2016, which is a continuation of application No. 14/487,683, filed on Sep. 16, 2014, now Pat. No. 9,296,562, which is a continuation-in-part of application No. 14/272,338, filed on May 7, 2014.

(60) Provisional application No. 61/820,212, filed on May 7, 2013.

(51) Int. Cl.
| | |
|---|---|
| *B65G 11/02* | (2006.01) |
| *B65G 11/16* | (2006.01) |
| *B65G 11/18* | (2006.01) |
| *B65G 11/00* | (2006.01) |

(52) U.S. Cl.
CPC ............. *B65G 11/02* (2013.01); *B65G 11/00* (2013.01); *B65G 11/16* (2013.01); *B65G 11/166* (2013.01); *B65G 11/18* (2013.01)

(58) Field of Classification Search
CPC ........ B65G 11/16; B65G 11/166; B65G 11/02
See application file for complete search history.

(56) References Cited

U.S. PATENT DOCUMENTS

| | | | | |
|---|---|---|---|---|
| 1,440,316 A | * | 12/1922 | Prirce ................ | B65G 11/063 193/27 |
| 1,510,288 A | * | 9/1924 | Malone ............... | B65G 11/186 193/34 |
| 1,719,545 A | * | 7/1929 | Grapp ................. | E04F 17/12 193/33 |
| 1,877,234 A | * | 9/1932 | Gallagher ........... | B65G 11/083 193/34 |
| 3,530,966 A | * | 9/1970 | Mathews ............ | B65G 11/026 193/29 |
| 3,709,345 A | * | 1/1973 | Price .................. | A01F 25/20 193/34 |
| 4,066,158 A | | 1/1978 | Hare | |
| 4,205,795 A | | 6/1980 | Graveman | |

(Continued)

*Primary Examiner* — Thomas Randazzo

(57) ABSTRACT

A modular chute system for providing safe convenient access to an inside cavity of the chute system from a variety of locations to enhance safer serviceability features a chute channel formed from a plurality of chute sections. Each chute section is formed from a plurality of rigid structural panels. An edge flange is disposed on each panel edge encompassing an entire panel outer periphery, and the edge flange of one panel is connected to the edge flange of another structural panel. Upon removal of a structural panel or set of adjacent structural panels, the chute channel is self-supporting and non-collapsing. Chute serviceability, such as replacement of interior liners or panels, can be accomplished by removing panels and replacing liners without entering the chute cavity.

20 Claims, 12 Drawing Sheets

(56) References Cited

U.S. PATENT DOCUMENTS

| | | | |
|---|---|---|---|
| 4,395,625 A | 7/1983 | Schutt | |
| 4,640,403 A * | 2/1987 | McDermott | E04F 17/12 193/34 |
| 4,896,435 A | 1/1990 | Spangler | |
| 5,127,507 A * | 7/1992 | McDermott | B65G 11/186 193/17 |
| 5,253,766 A * | 10/1993 | Sims | B07C 7/00 193/2 A |
| 5,735,377 A * | 4/1998 | Herren | B65D 90/043 193/33 |
| 5,941,362 A * | 8/1999 | Preston | B65G 11/183 193/34 |
| 6,279,715 B1 | 8/2001 | Herren | |
| 7,232,023 B2 * | 6/2007 | Ellis | B65G 11/166 193/2 R |
| 7,980,377 B2 * | 7/2011 | Ellis | B65G 21/2081 193/2 R |
| 8,039,075 B2 * | 10/2011 | Malmberg | B02C 17/225 428/44 |
| 8,485,336 B2 * | 7/2013 | Tenold | B65G 11/166 193/2 R |
| 9,139,366 B2 * | 9/2015 | Berroth | B65G 11/166 |
| 9,296,562 B1 * | 3/2016 | Van Bogaert | B65G 11/02 |
| 9,809,385 B1 * | 11/2017 | Van Bogaert | B65G 11/083 |
| 2008/0317992 A1 * | 12/2008 | Malmberg | B02C 17/225 428/44 |
| 2009/0139828 A1 | 6/2009 | Burstrom et al. | |
| 2009/0245989 A1 | 10/2009 | Mickelson | |
| 2010/0084244 A1 * | 4/2010 | Pittman | B65G 11/166 193/2 R |
| 2011/0114440 A1 | 5/2011 | Horniak et al. | |
| 2011/0290616 A1 | 12/2011 | Tenold et al. | |
| 2012/0217125 A1 | 8/2012 | Heddles | |
| 2013/0126294 A1 * | 5/2013 | George | B65G 11/026 193/2 A |

* cited by examiner

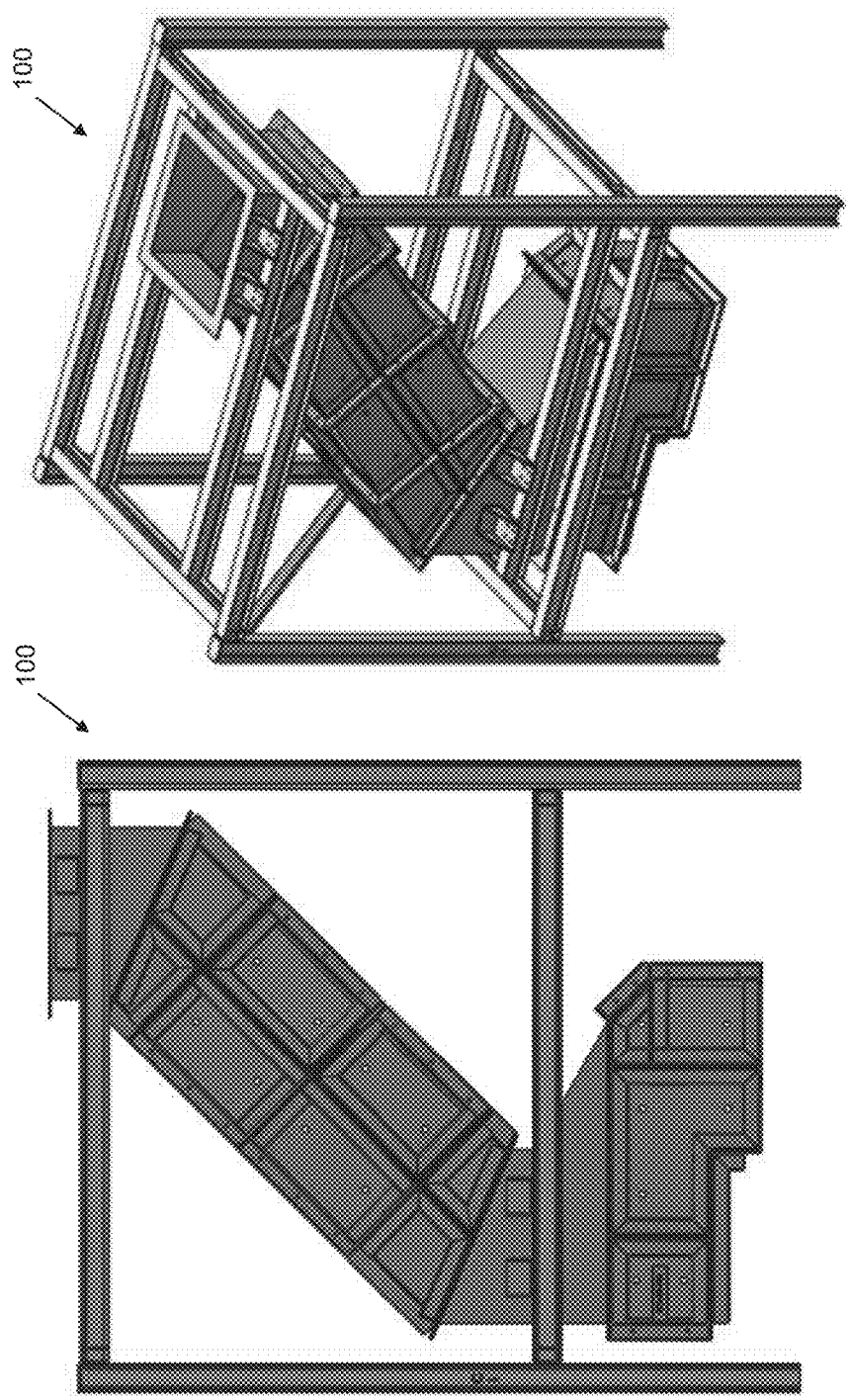

MODULAR CHUTE SYSTEM

CROSS REFERENCE

This application is a continuation-in-part and claims benefit of U.S. patent application Ser. No. 15/364,894 filed Nov. 30, 2016, which is a continuation-in-part and claims benefit of U.S. patent application Ser. No. 15/083,052 filed Mar. 28, 2016, which is a continuation and claims benefit of U.S. patent application Ser. No. 14/487,683 filed Sep. 16, 2014, now U.S. Pat. No. 9,296,562, which is a continuation-in-part and claims benefit of U.S. Non-Provisional patent application Ser. No. 14/272,338 filed May 7, 2014, which claims benefit of U.S. Provisional Patent Application No. 61/820,212 filed May 7, 2013, the specification(s) of which is/are incorporated herein in their entirety by reference.

FIELD OF THE INVENTION

The present invention relates to chutes and chute systems that are designed to transport flowing mass aggregate material. In one embodiment, the invention is used in mass aggregate gravity-fed applications specific to mining and aggregate commercial markets.

BACKGROUND OF THE INVENTION

Mass aggregate flow transfer systems, or chutes, have been used in a wide range of industries for many years, such as for example, mining and agriculture. Industrial chutes are typically made from large tubular components and by necessity are very heavy due to the sturdy and unitary construction and the extreme service conditions they must endure. Sometimes a chute is mounted at a hard-to-reach location, further adding to the difficulty of servicing the chute or clearing a clog in the chute. Mine workers servicing chute systems are constantly being exposed to several life-threatening conditions while servicing chutes. Conditions deemed by Mine Safety and Health Administration as potential threats to life and health include confined space entry, risk of engulfment, and falling hazards. Most times when a chute is serviced, a person must enter the chute via a single point of entry to perform repairs, which requires a fully confined space entry program to ensure safety.

In addition, a section of the chute, such as at the bottom section of a bend in the chute, may have an advanced physical decline than other sections due to the impact of falling material or abrasion due to sliding material, and would require earlier replacement. Typically, instead of replacing just the damaged section, the entire tube having the damaged section would have to be replaced. This repair would be costly and time consuming, as well as require longer periods of chute downtime.

U.S. Pat. No. 1,510,288 of Malone discloses a chute made up of sections that are formed by two right-angled plates that are bolted to each other to form a square tube. Each section has a top and bottom angle irons that are used to connect the abutting ends of the sections in series, i.e. the top angle iron of one section is connected to the bottom angle of another section. However, one section is only detachable from another section, whereas the two right-angled plates are not easily detachable; therefore the chute requires an entire section to be removed in order to service the chute. Further still, the chute of Malone requires additional external support and bracing in order to safely remove an entire section from the chute.

The present invention features a modular chute system for providing convenient access to an inside cavity of the chute system from a variety of locations to enhance serviceability and without requiring removal of tubular sections that would otherwise create a discontinuity, or gap, in the chute system. The chute system would also allow for sections to be repaired or replaced, as opposed to the entire tubular section. Further still, the present invention allows for an elimination or reduction of mine worker exposure to confined space entry by allowing for external removal of panel(s) to replace interior lining materials, which results in reduced plant downtime, and efficient use of materials to replace or maintain current form or used standard chute systems.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In some aspects, the present invention features a modular chute system for providing safe and convenient access to an inside cavity of the chute system from a variety of locations to enhance serviceability. In one embodiment, the system may comprise a chute channel formed from a plurality of hollow chute sections. In some embodiments, the chute channel may comprise an open chute top, an open chute bottom, the chute inside cavity disposed between and fluidly joining the chute top and the chute bottom, and the plurality of hollow chute sections.

According to one embodiment, each hollow chute section may be formed from a plurality of rigid structural panels. Each structural panel can comprise a panel interior surface, a panel exterior surface, a panel first edge, a panel second edge opposite of the panel first edge, a panel third edge connecting the panel first edge to the panel second edge, and a panel fourth edge opposite of the panel third edge and connecting the panel first edge to the panel second edge. An edge flange may be disposed on each panel edge encompassing the entire panel outer periphery. In some embodiments, the edge flange can project out and away from the panel exterior surface at an angle.

In one embodiment, the plurality of rigid structural panels are connected by consecutively adjoining the edge flange disposed on the panel fourth edge of each structural panel to the edge flange disposed on the panel third edge of another structural panel at a flush butt joint connection, thereby forming each hollow chute section. In another embodiment, the edge flange disposed on the panel first edge of each structural panel and proximal to the chute top may collectively form a chute top flange of each hollow chute section. The edge flange disposed on the panel second edge of each structural panel and proximal to the chute bottom may collectively form a chute bottom flange of each hollow chute section. The plurality of hollow chute sections may be connected by consecutively adjoining the chute bottom flange of each hollow chute section to the chute top flange of another hollow chute section at a flush butt joint connection, thereby forming the chute channel.

According to yet another aspect, the chute channel may be comprised of a plurality of rigid structural panels, each structural panel comprising a panel interior surface, a panel exterior surface, at least three panel edges, wherein the panel edges combine to form a panel outer periphery, and an edge flange disposed on each panel edge encompassing the entire panel outer periphery and projecting out and away from the panel exterior surface at an angle Θ ranging from about 30° to about 135°. The rigid structural panels may be connected by consecutively adjoining the edge flange of each structural panel to the edge flange of another structural panel at a flush butt joint connection such that the connected structural panels form an enclosed hollow structure. The enclosed hollow structure forms the chute channel and a hollow interior of the enclosed hollow structure forms a chute inside cavity disposed between and fluidly joining a first opening and a second opening of the chute channel. In some aspects, such arrangement of the chute channel results in a plurality of flush butt joint connections disposed throughout the chute channel at each structural panel edge flange meeting with another structural panel edge flange. Each flush butt joint connection may be a vertical flush butt joint connection, a horizontal flush butt joint connection, or a diagonal flush butt joint connection.

One of the unique and inventive technical features of the present invention is the panels that can be attached horizontally, vertically, or even diagonally at each structural panel edge flange meeting with another structural panel edge flange to form a structurally sound chute system, which allows the flow of materials to enter and discharge through a fully enclosed chute. These connections secure the interface of structural panels as well as the interface between chute sections. Further still, removal of any single structural panel from the chute channel provides convenient access to the chute inside cavity. Without wishing to limit the invention to any theory or mechanism, it is believed that the technical feature advantageously provides for a self-supporting and non-collapsible chute system that allow for any single structural panel to be removed. Although the chute system utilizes a top to bottom connectivity, it is not limited solely to this connection since it also implements non-horizontal and non-vertical connection seams strategically place throughout the chute system. None of the presently known prior references or work has the unique inventive technical feature of the present invention.

The structural panels of the present invention is another advantageous technical feature that function as independent components that collectively comprise each hollow chute section. A chute may be assembled by connecting structural panels at the top and bottom interfaces, as well as connecting their side interfaces. The present invention has the design capability to remove and replace structural panels as needed. Panels above and below a given chute section are not essential to retain the structural integrity of the chute system due to the structural design and strength of the connection points.

In contrast, U.S. Pat. No. 1,510,288 of Malone does not utilize independent structural panels to create a chute section. Malone employs a single box shape having only horizontal flanges on each chute section, which only enables top and bottom connections for securing the interface between chute sections. Lower cubicle sections must be in position to secure the upper chute sections from collapsing. Malone also teaches a plurality of angle irons, nuts, bolts, and overlapping components serving to secure each section of the chute. A plurality of mouthpieces, each projected through a window of a building, further comprise the Malone chute and serves to secure the sections of each chute to the building and thus to one another. Since the chute is structurally dependent upon a building, the chute of Malone is not a self-supporting and non-collapsing chute.

The chute of the present invention is customizable to conform to various flow paths. Therefore, the chute is not limited to one specific shape in its entirety and can be formed to meet the specific needs by any end user. Contrary to the present invention, the Malone chute is limited in its route of travel capabilities due to its singular sectional box shape.

BRIEF DESCRIPTION OF THE DRAWINGS

The features and advantages of the present invention will become apparent from a consideration of the following detailed description presented in connection with the accompanying drawings in which:

FIG. 9A shows a side view of an embodiment of the chute system attached to an exterior structure via an angle mount.

FIG. 9B shows a perspective view of the chute system attached to the exterior structure via the angle mount.

DESCRIPTION OF PREFERRED EMBODIMENTS

Figure 1:
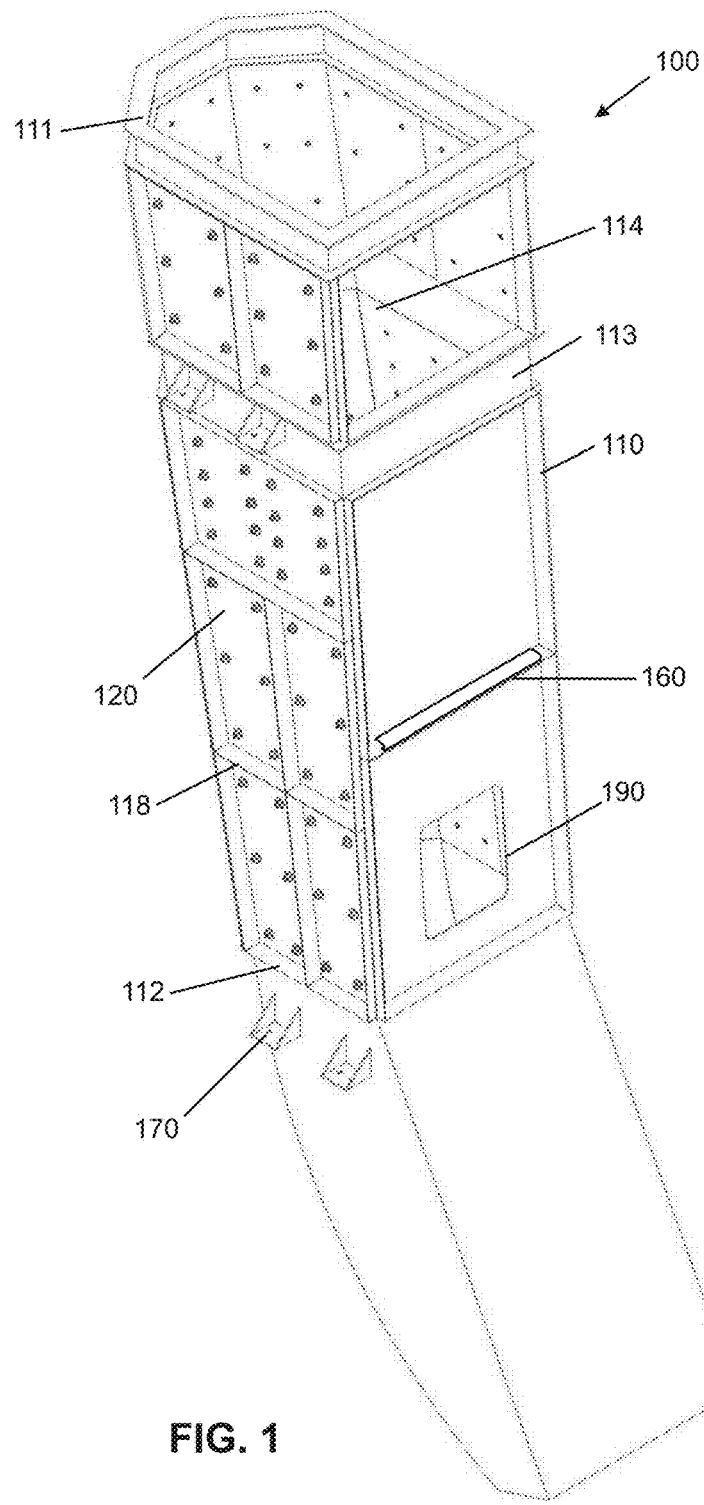
FIG. 1 shows a perspective view of a non-limiting embodiment of the present invention.

Following is a list of elements corresponding to a particular element referred to herein:

100 Modular chute system
110 Chute channel
111 Chute top
112 Chute bottom
113 Chute side wall
114 Chute inside cavity
115 Chute section
116 Chute top flange
117 Chute bottom flange
118 Butt joint connection
120 Structural panel
121 Panel first edge 122 Panel second edge
123 Panel third edge
124 Panel fourth edge
125 Panel edge
126 Panel outer periphery
130 Panel interior surface
131 Panel exterior surface
140 Edge flange
145 Chute section corner
150 Aperture
151 Wear plate
160 Fugitive dust cap
161 Cap first leg
162 Cap second leg
163 Cap middle leg
164 Channel
170 Angle mount
190 Inspection window
1171 Fastener
1173 Mounting block
1174 T-slot nut
1175 Block
1176 Internally threaded aperture
1177 Jack screw
1178 Non-threaded slot
1179 Scaffold clip
1180 Fastener
1181 Flat horizontal component
1182 Flat vertical component
1183 Scaffold base component
1184 Floor member
1185 Angled support member
1186 Hook
1187 Rest
1188 Vertical support
1189 Floor member Referring now to FIGS. 1-14G, the present invention features a modular chute system (100) for providing a safe convenient access to a chute inside cavity (114) of a chute channel (110) in the system (100) from a variety of locations to enhance serviceability.

In some embodiments, the modular chute system (100) may comprise the chute channel (110) formed from a plurality of hollow chute sections (115) connected to each other. The chute channel (110) may comprise an open chute top (111), an open chute bottom (112), the chute inside cavity (114) disposed between and fluidly joining the chute top (111) and the chute bottom (112), and the plurality of hollow chute sections (115), each formed by a plurality of rigid structural panels (120).

According to one embodiment, each structural panel (120) may comprise a panel interior surface (130), a panel exterior surface (131), and at least three panel edges, hereinafter collectively referred to as panel edges (125). The panel edges (125) may combine to form a panel outer periphery (126). An edge flange (140) may be disposed on each panel edge (125) encompassing the entire panel outer periphery (126) such that the edge flange (140) projects out and away from the panel exterior surface (131) at an angle Θ, which can range from about 30° to about 135°. In preferred embodiments, the plurality of rigid structural panels (120) may be connected in succession by consecutively adjoining the edge flange (140) of each structural panel (120) to the edge flange (140) of another structural panel (120) at a flush butt joint connection (118), and adjoining the edge flange (140) of a final structural panel (120) to the edge flange (140) of an initial structural panel (120) at a flush butt joint connection (118), thereby forming each hollow chute section (115). In exemplary embodiments, the plurality of structural panels (120) can range from about 3 to 30 structural panels for each chute section (115).

In some embodiments, the edge flange (140) disposed on the panel edge of each structural panel (120) and proximal to the chute top (111) collectively forms a chute top flange (116) of each hollow chute section (115), and the edge flange (140) disposed on the panel of each structural panel (120) and proximal to the chute bottom (112) collectively forms a chute bottom flange (117) of each hollow chute section (115). In preferred embodiments, the plurality of hollow chute sections (115) may be connected by consecutively adjoining the chute bottom flange (117) of each hollow chute section (115) to the chute top flange (116) of another hollow chute section (115) at a flush butt joint connection (118), thereby forming the chute channel (110).

This arrangement of the chute channel (110) results in a plurality of flush butt joint connections (118) disposed throughout the chute channel (110) at each structural panel edge flange (140) meeting with another structural panel edge flange (140), e.g. every structural panel edge flange (140) that joins another structural panel edge flange (140) is a flush butt joint connection (118). In some embodiments, each flush butt joint connection (118) may be a vertical flush butt joint connection, a horizontal flush butt joint connection, or a diagonal flush butt joint connection.

Without wishing to be bound by a particular theory or mechanism, upon removal of any single structural panel (120) from any hollow chute section (115) provides convenient access to the chute inside cavity (114). Further still, the chute channel (110) is self-supporting and non-collapsing upon removal of any single structural panel (120).

In one embodiment, each chute section (115) can have three or four section corners (145), each chute section corner (145) having an interior angle ranging from about 15°-90°. As known to one skilled in the art, an "interior angle" refers to an angle between two sides and inside a shape. Thus, the chute section may be three-sided, e.g. triangular, or four-sided, e.g. rectangular. In some embodiments, each chute section corner (145) may be formed by a single structural panel that is a corner panel such that said corner panel is bent to form the interior angle of the chute section corner. In other embodiments, each chute section corner (145) is formed by two structural panels having their adjoining edge flange (140) bent so as to form the interior angle of the chute section corner.

In another embodiment, each chute section (115) can have at least five section corners (145), each chute section corner (145) having an interior angle of 90° or greater than 90°. For example, a five-corner chute section may be in the shape of a pentagon, or a six-sided chute section may be in the shape of a hexagon or an L-shape. In some embodiments, each chute section corner (145) may be formed by a single structural panel that is a corner panel such that said corner panel is bent to form the interior angle of the chute section corner. In alternative embodiments, each chute section corner (145) may be formed by two structural panels having their adjoining edge flange (140) bent so as to form the interior angle of the chute section corner.

According to another embodiment, each structural panel (120) can comprise a panel interior surface (130), a panel exterior surface (131), a panel first edge (121), a panel second edge (122) opposite of the panel first edge (121), a panel third edge (123) connecting the panel first edge (121) to the panel second edge (122), and a panel fourth edge (124) opposite of the panel third edge (123) and connecting the panel first edge (121) to the panel second edge (122). In some embodiments, the panel first edge (121), the panel second edge (122), the panel third edge (123), and the panel fourth edge (124) (hereinafter collectively referred to as panel edges (125)) combined form a panel outer periphery (126).

In some embodiments, the panel third edge (123) is disposed at an angle $\theta_1$ relative to the panel first edge (121), and the panel fourth edge (124) is disposed at an angle $\theta_2$ relative to the panel first edge (121). In one embodiment, $\theta_1$ can range from about 15° to about 90°. For example, $\theta_1$ ranges from about 15° to about 30°, or about 30° to about 45°, or about 45° to about 60°, or about 60° to about 75°, or about 75° to about 90°. In another embodiment, $\theta_1$ is about 15°, 30°, 45°, 60°, or 90°. In yet another embodiment, the angle $\theta_2$ can range from about 15° to about 90°. For instance, $\theta_2$ ranges from about 15° to about 30°, or about 30° to about 45°, or about 45° to about 60°, or about 60° to about 75°, or about 75° to about 90°. In a further embodiment, $\theta_2$ is about 15°, about 30°, about 45°, about 60°, or about 90°. In an exemplary embodiment, the panel third edge (123) is disposed at a 90° angle relative to the panel first edge (121), and the panel fourth edge (124) is disposed at 90° angle relative to the panel first edge (121), thereby forming rectangular shape. As another example, the panel third edge (123) is disposed at a 90° angle relative to the panel first edge (121), and the panel fourth edge (124) is disposed at 45° angle relative to the panel first edge (121), thereby forming a right trapezoid.

Figure 2:
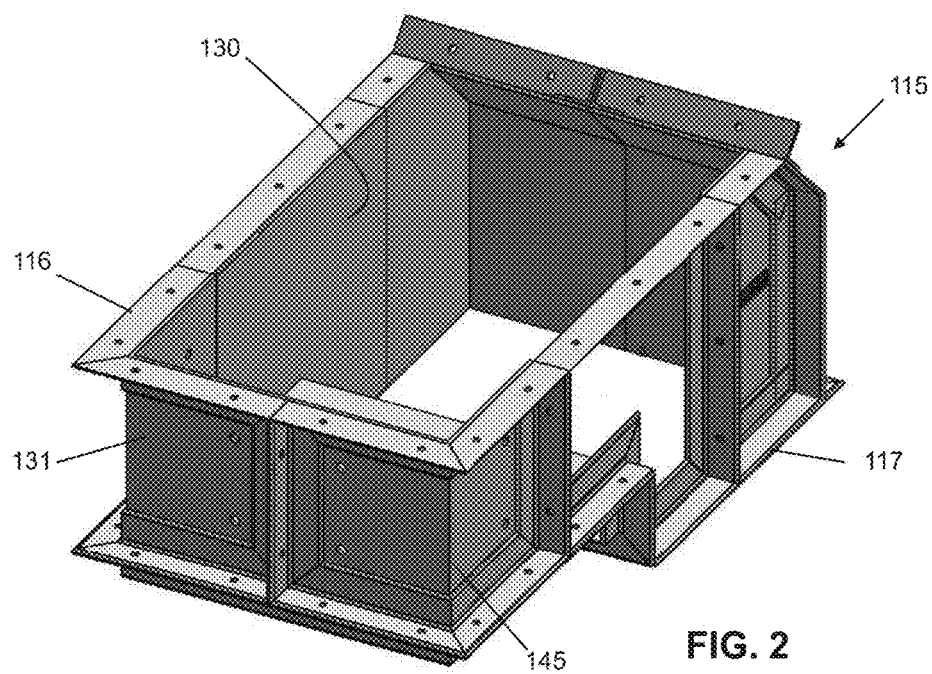
FIG. 2 shows a perspective view of a chute section and a structural panel removed for access.
Figure 3:
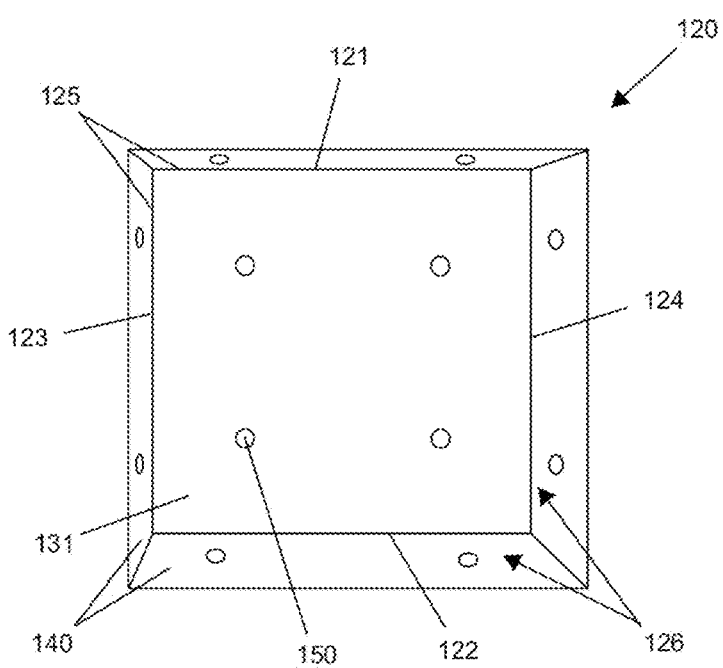
FIG. 3 shows a front, perspective view of a structural panel.
Figure 12:
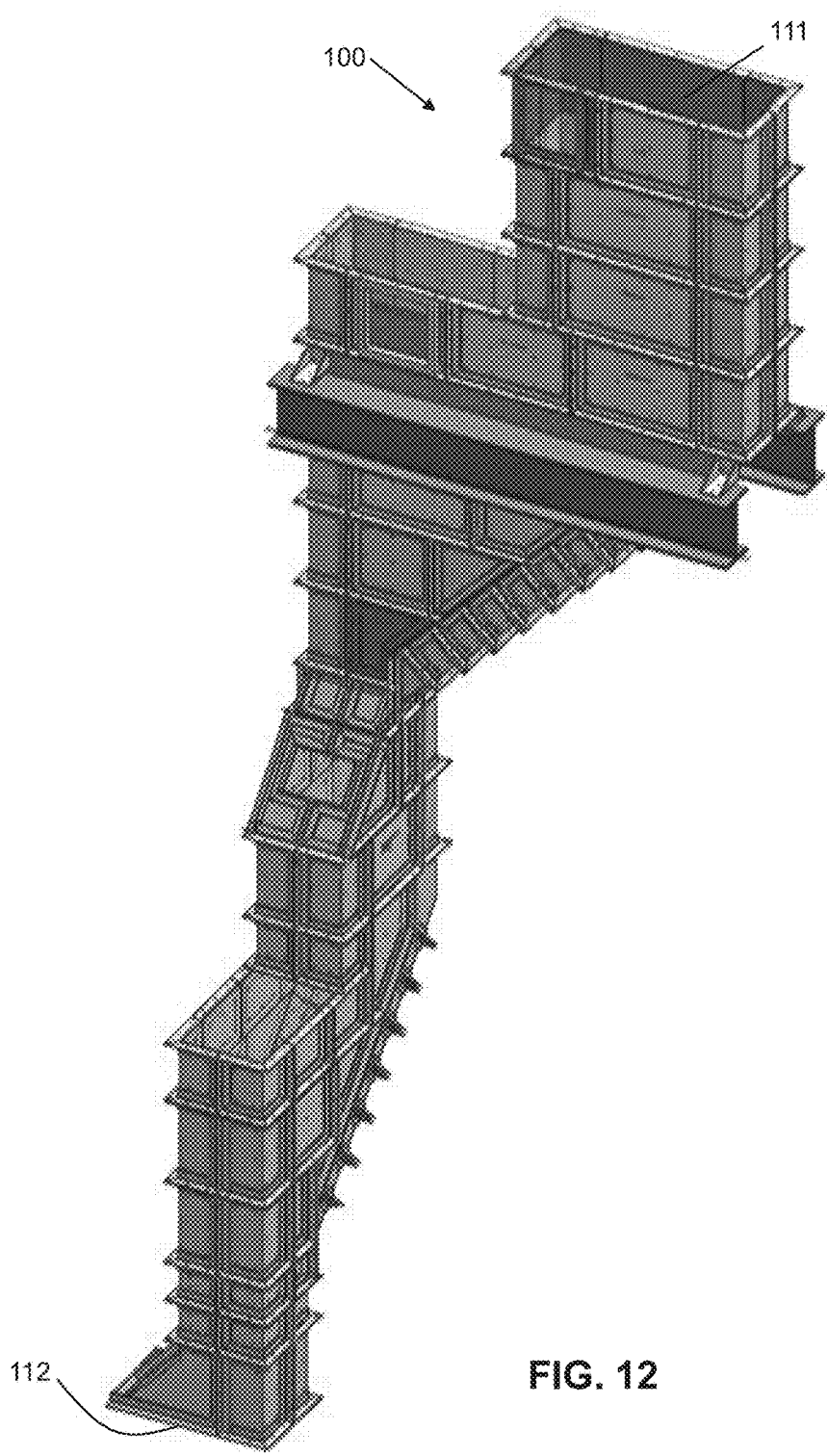
FIG. 12 is a perspective view of another embodiment of the chute system.
Figure 13:
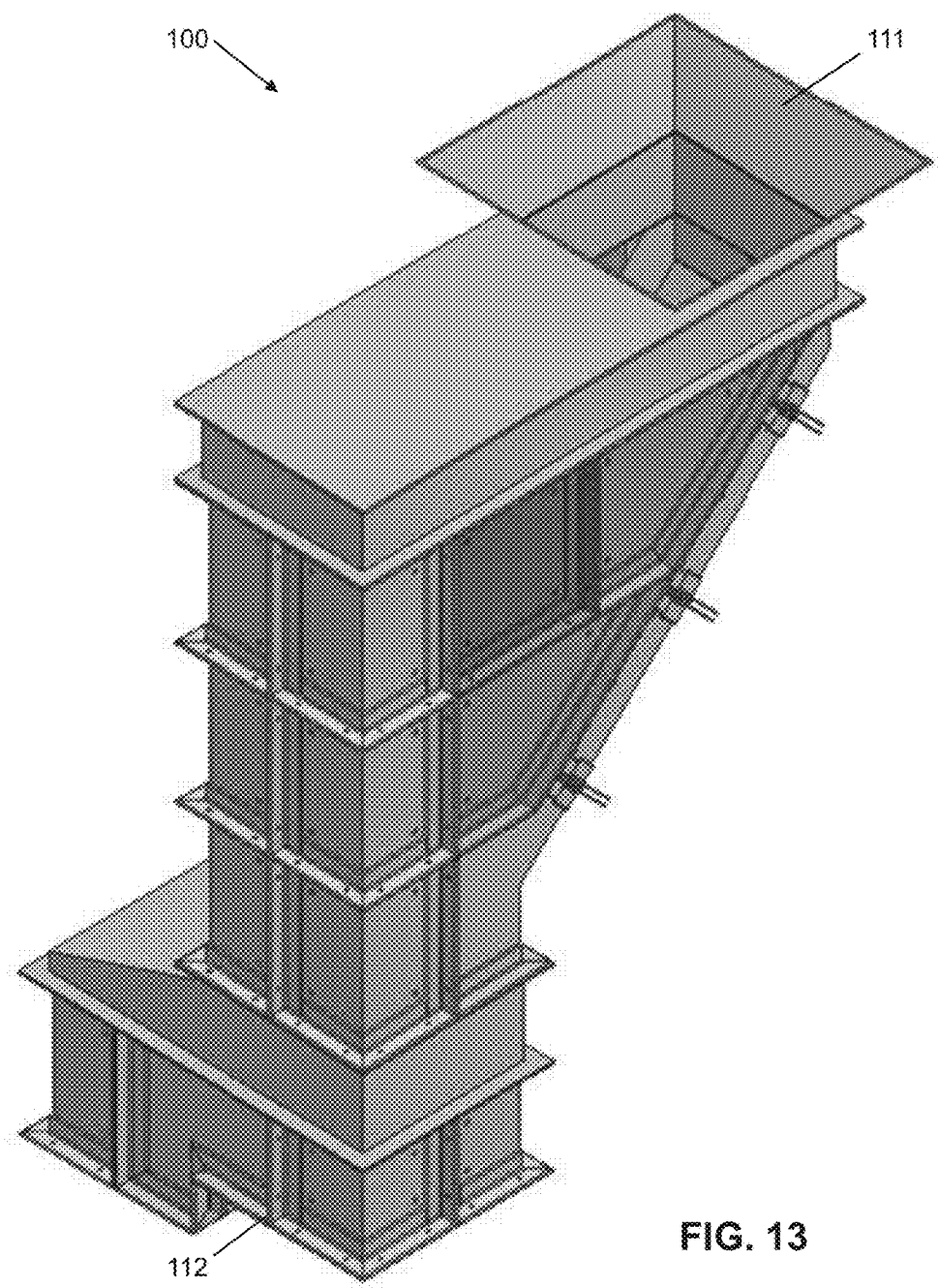
FIG. 13 is a perspective view of another embodiment of the chute system.
Figure 14A:
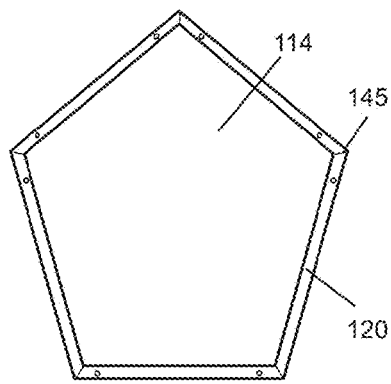
FIGS. 14A-14G show top views of various embodiments of the chute sections.
Figure 14B:
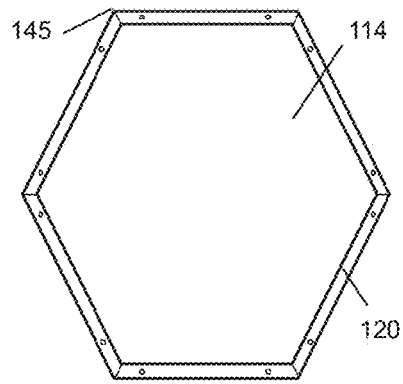
Figure 14C:
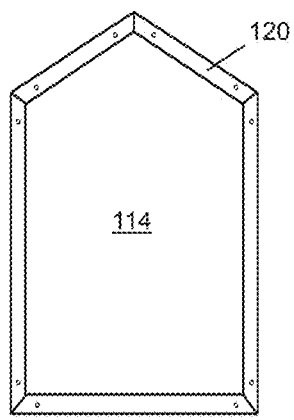
Figure 14D:
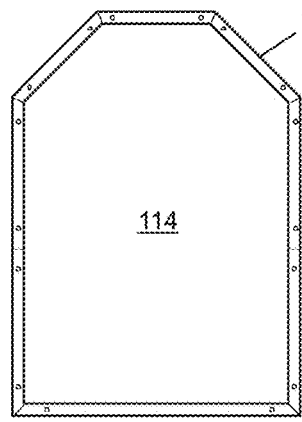
Figure 14E:
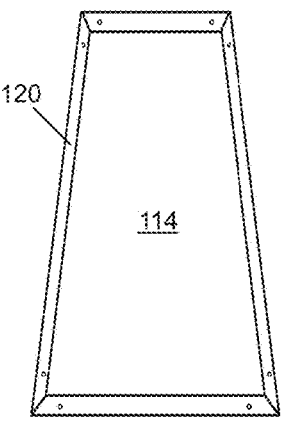
Figure 14F:
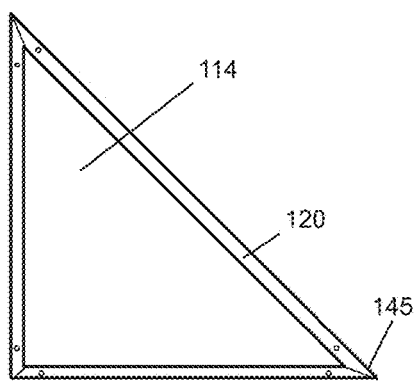
Figure 14G:
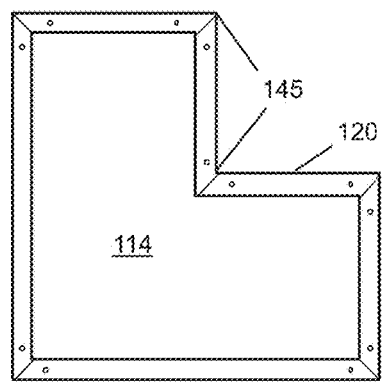

However, the structural panels (120) are not limited to having four panel edges. Referring to FIG. 12, the structural panel (120) may have only three panel edges if the panel has a triangular-shape. In other embodiments, the structural panel (120) can have five panel edges. Referring to FIG. 2, the structural panel (120) can have six panel edges if, or instance, the panel has an "L" shape. Also as used herein, the edges of a structural panel are collectively referred to as panel edges (125) and that combined form a panel outer periphery (126).

An edge flange (140) may be disposed on each panel edge (125) encompassing the entire panel outer periphery (126). In preferred embodiments, the edge flange (140) can project out and away from the panel exterior surface (131) at an angle $\theta_3$. In one embodiment, $\theta_3$ can range from about 30° to about 135°. For example, $\theta_3$ may be about 30°, about 45°, about 60°, about 90° or about 135°. In other embodiments, the edge flange (140) is formed from and contiguous with the panel (120). In further embodiments, the edge flange (140) is formed from angle iron and attached to the panel (120).

In one embodiment, the plurality of rigid structural panels (120) are connected by consecutively adjoining the edge flange (140) disposed on the panel fourth edge (124) of each structural panel (120) to the edge flange (140) disposed on the panel third edge (123) of another structural panel (120) at a flush butt joint connection (118). The edge flange (140) disposed on the panel fourth edge (124) of a final structural panel (120) may then be adjoined to the edge flange (140) disposed on the panel third edge (123) of an initial structural panel (120) at a flush butt joint connection (118), thereby forming each hollow chute section (115). In some embodiments, adjoining the edge flange (140) disposed on the panel third edge (123) and the edge flange (140) disposed on the panel fourth edge (124) may form a vertical seam.

In some embodiments, the number of structural panels making up a chute section (115) can range from 3 to 20 structural panels. For example, the chute section may have a square cross-section and be formed from 8 structural panels, 2 for each side of the square chute section. As another example, the chute section may be a rectangle formed from 6 structural panels, one panel for each shorter side and two panels for each longer side of the rectangular chute section. In yet another embodiment, the chute section may have a triangular cross-section and be formed from 3 structural panels.

In a further embodiment, when the panel third edge (123) of one structural panel and the panel fourth edge (124) of another structural panel form a corner in the chute section, the edge flange of the panel third edge (123) and the panel fourth edge (124) may be a single unitary edge flange. For example, the unitary edge flange is an "L" shaped corner flange where one arm of the "L" is disposed on the panel third edge (123) and the other arm of the "L" is disposed on the panel fourth edge (124).

In another embodiment, the edge flange (140) disposed on the panel first edge (121) of each structural panel (120) and proximal to the chute top (111) may collectively form a chute top flange (116) of each hollow chute section (115). The edge flange (140) disposed on the panel second edge (122) of each structural panel (120) and proximal to the chute bottom (112) may collectively form a chute bottom flange (117) of each hollow chute section (115). In preferred embodiments, the plurality of hollow chute sections (115) are connected by consecutively adjoining the chute bottom flange (117) of each hollow chute section (115) to the chute top flange (116) of another hollow chute section (115) at a flush butt joint connection (118), thereby forming the chute channel (110). More preferably, every structural panel edge flange (140) that joins another structural panel edge flange (140) is a flush butt joint connection (118).

Without wishing to limit the invention to a particular theory or mechanism, any single structural panel (120), or a set of adjacent structural panels, can be removed from any hollow chute section (115) to provide safe and convenient access to the chute inside cavity (114) of each chute channel in the system from a variety of locations to enhance serviceability. For example, chute serviceability, such as replacement of wear plates, interior liners or panels, can be accomplished by removing panels and replacing liners without entering the chute cavity. More preferably, the chute channel (110) is self-supporting and non-collapsing upon removal of any single structural panel (120) or set or panels, i.e. no external bracing is required when a structural panel is removed from a chute section. Removing the panel(s) does not compromise the structural integrity of the chute system since the chute section will have the remaining structural panels that are adjoined by their vertical seams for support.

In some embodiments, a point of entry, i.e. manhole, is formed upon removal of any single structural panel (120), or upon removal of a plurality of adjacent structural panels (120). By allowing for a desired number of panels to be removed, the point of entry can be sized as needed for the service person, thereby improving safety and convenience. Further still, the individual structural panel can removed and replaced as needed. For example, if a panel has become worn down, said panel may be replaced by a new panel without replacing the other panels of a particular chute section.

As shown in FIGS. 9A-13, the modular chute system (100) may comprise a plurality of chute channels (110) joined in a series to form the system (100) in a variety of lengths with a variety of shapes, branches, or configurations. For example, the system may have two or more chute channels fluidly connected to a single chute channel. In some embodiments, the chute channels may be perpendicular or diagonal relative to a ground surface. In other embodiments, a diagonal chute channel may be fluidly connected to a perpendicular chute channel. In other embodiments, the system may have one or more diagonal chute channels converging to a single perpendicular chute channel, or alternatively, one or more perpendicular chute channels converging to a single diagonal chute channel. In further embodiments, the system may have one or more diagonal chute channels may be fluidly connected one or more perpendicular chute channels.

In some embodiments, the chute channel (110) may have a rectangular or square cross-section, e.g., an intersection of the chute channel and a plane traversing it is rectangular or square in shape. As used herein, a cross-section of the chute channel refers to the intersection of the chute channel and a plane traversing it. For instance, as shown to FIGS. 14A-14G, the cross-section of the chute channels can vary in shape. In some embodiments, the cross-section of the chute channel (110) may be in the shape of a triangle, a pentagon, a hexagon, an octagon, or an "L". In other embodiments, the chute channel (110) may be cylindrical. In still other embodiments, the chute channel may have at least 3, 4, 5, 6, 7, 8, 9, or 10 sides. Each side of the channel section that forms the chute channel may comprise one or more structural panels. In further embodiments, the chute channel (110) may be tapered such that the open chute top (111) is larger than the open chute bottom (112) or vice versa.

Figure 5A:
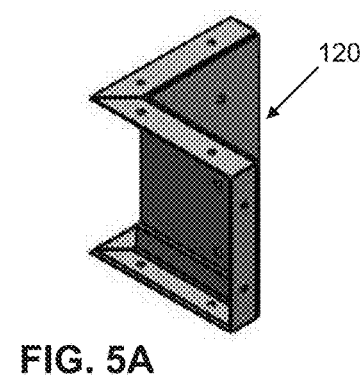
FIGS. 5A-5C show non-limiting embodiments of a structural corner panel.
Figure 5B:
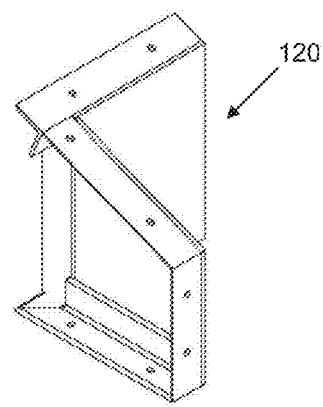
Figure 5C:
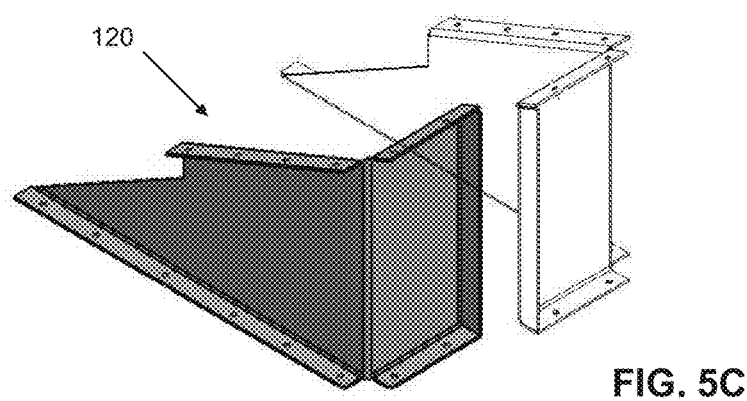

As shown in FIGS. 5A-5C, in some embodiments of the chute section (115), four of the structural panels may be corner panels. For example, in a non-limiting configuration, the first panel edge (121) can be bent at a 90° angle and the second panel edge (122) is bent at a 90° angle. However, other angles and number of corner panels are feasible. For example, as shown in FIGS. 14A-14G, the chute section may have 3 to 8 corner panels. In one embodiment, the first panel edge (121) and the second panel edge (122) can be bent at an angle greater than 90°. In another embodiment, the first panel edge (121) and the second panel edge (122) can be bent at an angle less than 90°.

In other embodiments, the structural panels (120) may be flat, planar panels. The flat panels may be disposed between two corner panels based on the desired shape and size of the chute channel. For example, at least 1 or 2 or 3 panels may be connected in series and then adjoined to a corner panel at each end. As such, the number of structural panels making up a chute section (115) can range from 3 to 20 structural panels. In alternative embodiments, the panel (120) may be convex or concaved.

Without wishing to limit the invention to a particular theory or mechanism, the structural panels (120) are designed as independent components that can attach to each other horizontally, vertically, or diagonally. When these panels are bolted together, the product forms a structurally sound chute system that allows the flow of materials to enter and discharge through the chute channel.

Figure 6A:
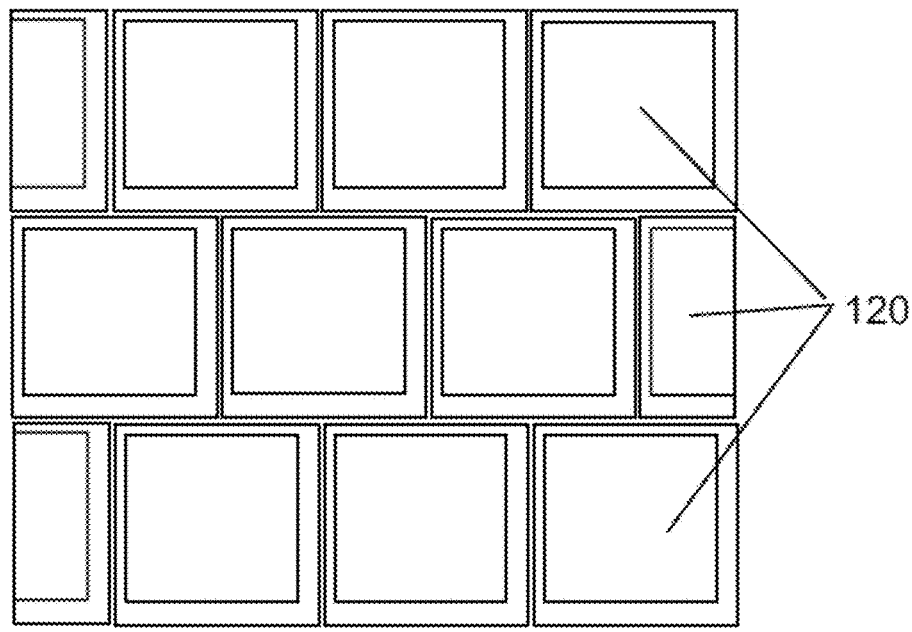
FIG. 6A shows a front view of the structural panels in an offset orientation.

In one embodiment, as shown in FIG. 6A, a first row of structural panels (120) of one chute section (115) is disposed on a second row of structural panels (120) of another chute section (115) in an offset manner such that a vertical seam of the first row of structural panels (120) is misaligned from a vertical seam of the second row of structural panels (120).

Figure 6B:
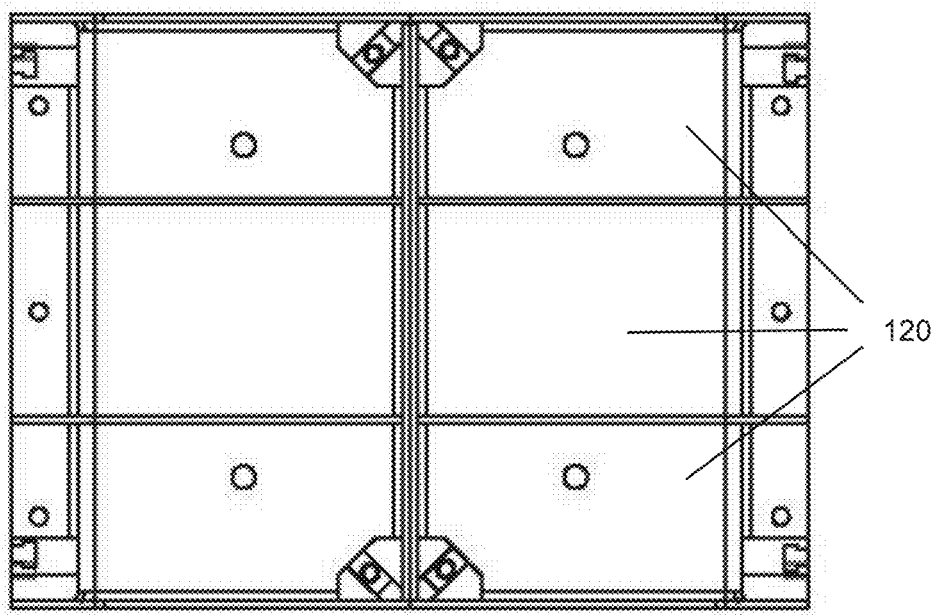
FIG. 6B shows a front view of the structural panels in an aligned orientation.
Figure 7:
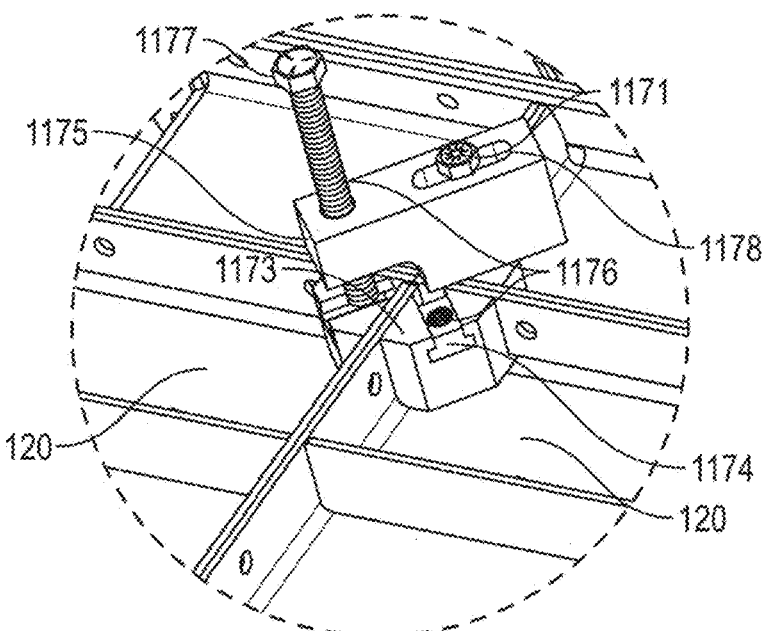
FIG. 7 shows a perspective view of the panel removal tool.
Figure 8:
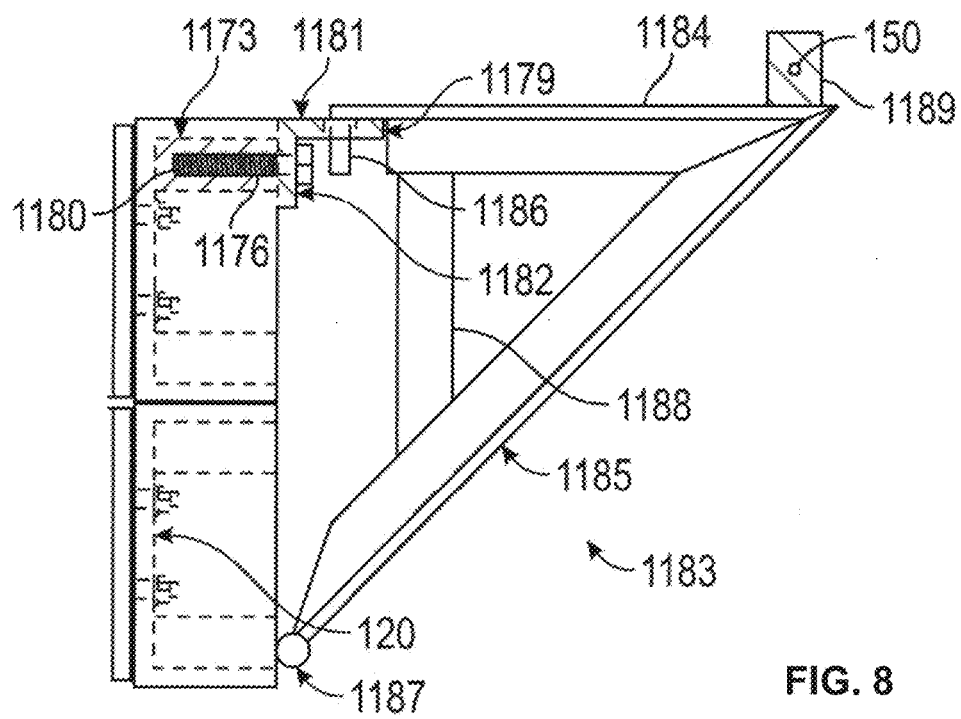
FIG. 8 shows a side view of an embodiment of the scaffolding system
Figure 9D:
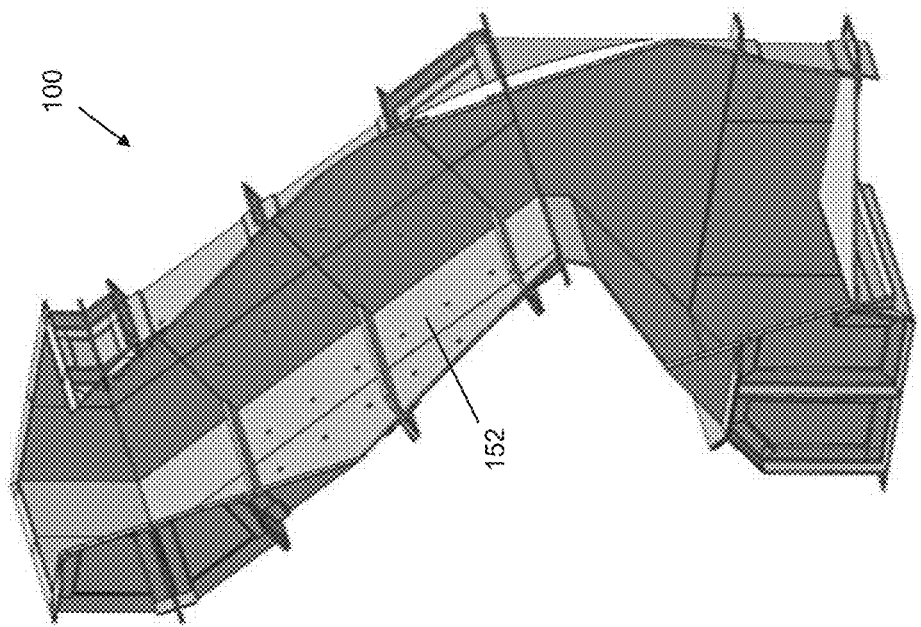
FIG. 9D shows a cutaway view of the chute system.
Figure 9C:
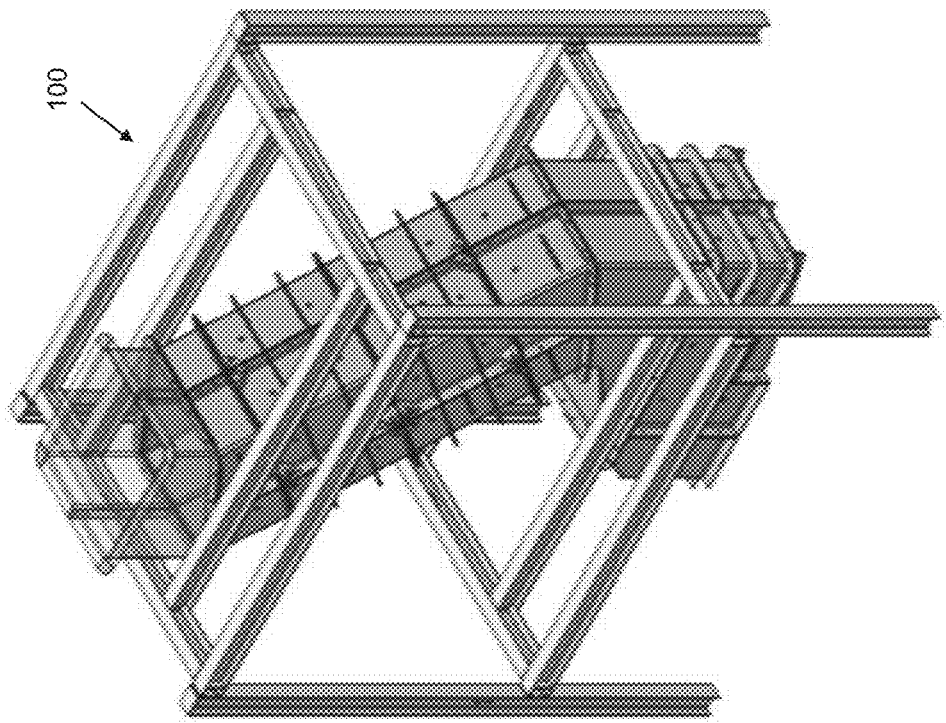
FIG. 9C shows another perspective view of the chute system attached to the exterior structure via the angle mount.
Figure 10:
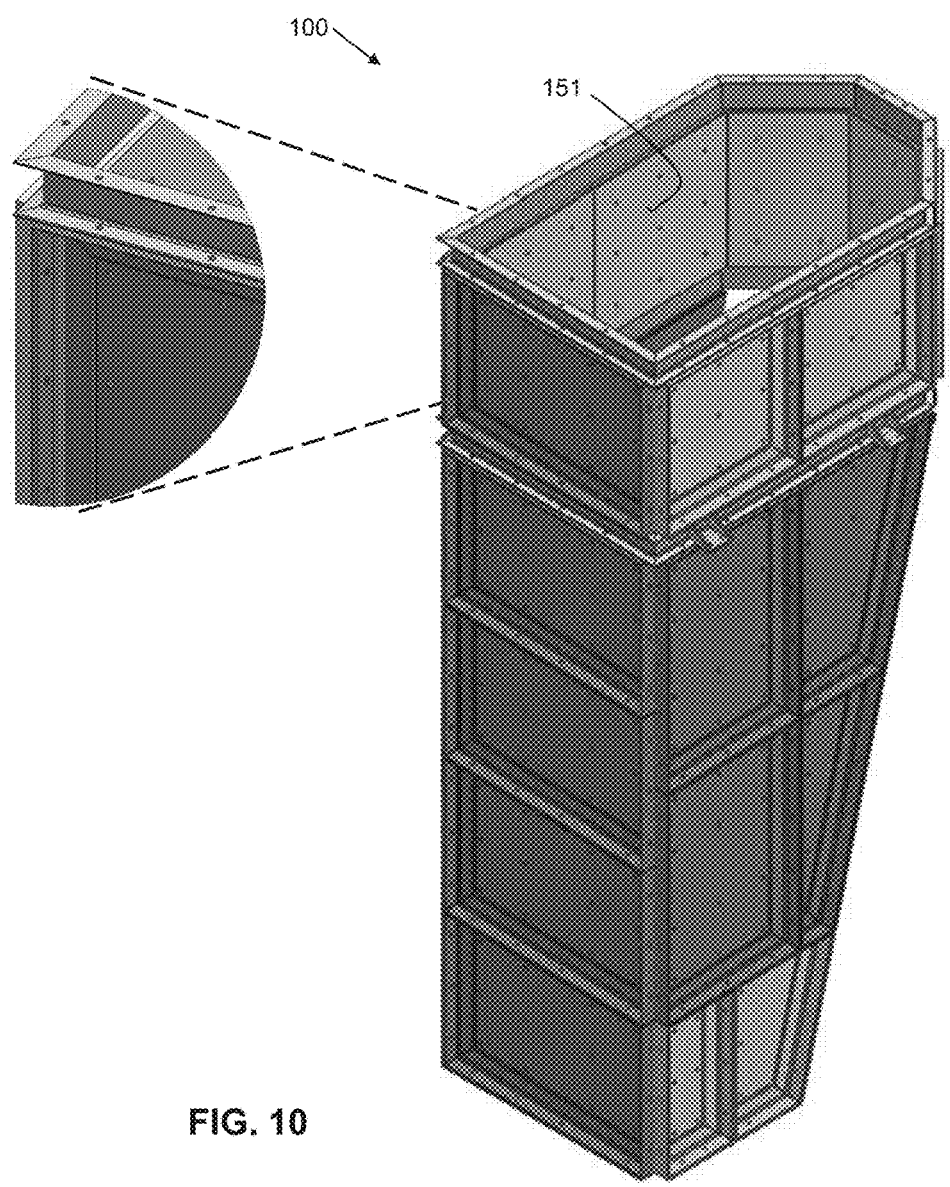
FIG. 10 is a perspective view of another embodiment of the chute system.

In another embodiment, as shown in FIG. 6B, a first row of structural panels (120) of one chute section (115) is disposed on a second row of structural panels (120) of another chute section (115) in an aligned manner such that vertical seams of the first row of structural panels (120) are aligned with vertical seams of the second row of structural panels (120).

In some embodiments, the structural panels may be standardized to either a square or a rectangular shape. In other embodiments, since the transition point of all chutes is unique to the property or location of use, custom panels can be made to fit panel size and shaped required. For example, a trapezoidal panel having a $\theta_1$ ranging from about 15°-90° and a $\theta_2$ ranging from about 15°-90°, with the caveat that $\theta_1$ and $\theta_2$ are not both 90°, may be use to mate to the standard sized panels, thereby allowing of an angled chute channel. The standard sized panels may be connected to each other or the corner panels to produce a tube. Heavy duty structural lined collars may be used for support and as a loading point of the chute system. The custom, corner, and standard panels may then be attached to the collar points so that the chute channel can begin its descent from the open chute top above the collar and down through the modular chute sections.

Table 1 shows non-limiting examples of panel types and sizes.

TABLE 1

| | |
|---|---|
| Standard Panel | 1 ft × 1 ft Square |
| | 1 ft × 2 ft Rectangle |
| | 1 ft × 3 ft Rectangle |
| | 2 ft × 2 ft Square |
| | 2 ft × 3 ft Rectangle |
| | 2 ft × 4 ft Rectangle |
| | 1 ft × 1 ft Square |
| Corner-15° thru 90° | 1 ft × 1 ft |
| | 1 ft × 2 ft |
| | 1 ft × 3 ft |
| | 2 ft × 2 ft |
| | 2 ft × 3 ft |
| | 3 ft × 3 ft |
| Custom | Triangles, Trapezoids, or L-shaped panels having various angles designed to fit with the above mentioned based on desired slope and taper of the chute channel |

In some embodiments, an aperture (150) is disposed through the structural panel (120) from the panel interior surface (130) to the panel exterior surface (131). The aperture (150) may be adapted for use for mounting a wear plate (151) via a fastener (1171). In other embodiments, one or more apertures (150) are located at the edge flange (140) and used to attach structural panels (120), chute sections (115), and chute channels (110). In some embodiments, the aperture (150) is internally threaded. Fasteners (1171) may be removably attached to the apertures in order to connect the structural panels (120), chute sections (115), and chute channels (110).

In one embodiment, the wear plate (151) is disposed on the panel interior surface (130) for covering the panel interior surface (130). In another embodiment, the wear plate (151) may cover the panel interior surface (130) with the exception of an edge offset from each of the panel edges (125). The edge offset from the panel edges (125) is configured to form gaps (152) between the wear plates (151). Without wishing to limit the invention to a particular theory or mechanism, the wear plate (151) is effective for protecting the interior surface (130) and prolonging the life of the panel. For example, a wear plate may be strategically placed on panels that receive maximum impact from the falling material, such as a panel located at the base of a vertical drop. In some embodiments, the wear plate (151) is constructed from a metal, a steel plate, a ceramic, a polymer, an ultra-high molecular weight polyethylene material, or an abrasion resistant material. One of ordinary skill in the art can determine the choice of material and location of the wear plate based on the chute application.

Figure 11:
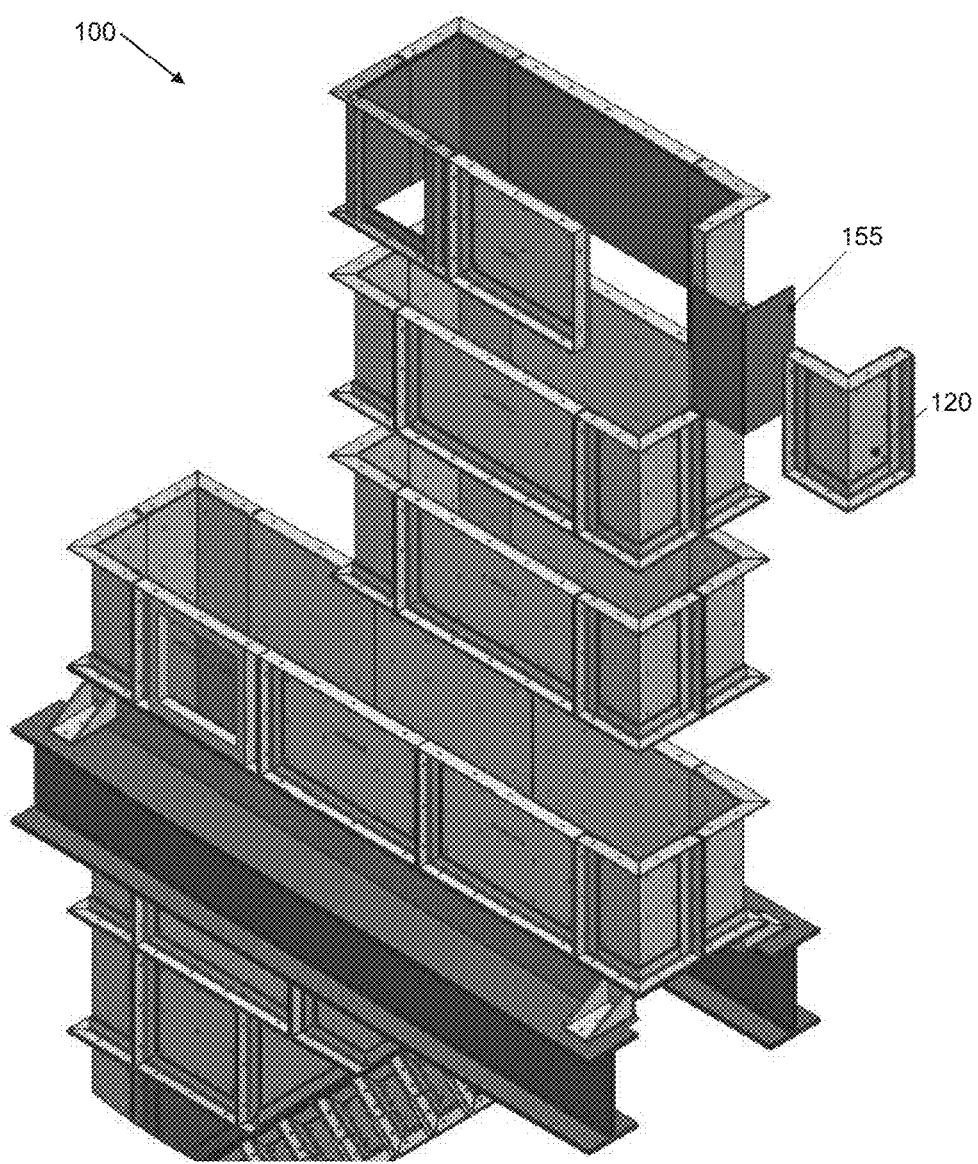
FIG. 11 is an exploded view of another embodiment of the chute system. An interior surface of structural panels may be lined with a liner.

As shown in FIG. 11, in one embodiment, the panel interior surface (130) may be covered with a protective liner (155), which can also protect the interior surface (130) and prolong the life of the panels. The protective liner (155) can be constructed from a ceramic material, an abrasion-resistant material, a polymer material, an ultra-high molecular weight polyethylene material, or a rubber material. One of ordinary skill in the art can determine the choice of material of the liner based on the chute application.

In some embodiments, the structural panels (120) and the edge flanges (140) may be constructed from ferrous or non-ferrous materials. For example, the structural panels (120) may be constructed from metal, including but not limited to, ferrous metals, carbon steel or stainless steel. In other embodiments, the edge flange (140) may be constructed from metal, including but not limited to, ferrous metals, carbon steel or stainless steel. In further embodiments, the structural panels (120) or edge flanges (140) may be constructed from a non-ferrous material, such as rigid plastics, polycarbonates, or polyacrylates.

In other embodiments, an inspection window (190) may be disposed on at least one of the structural panels (120). The inspection window can allow for viewing of the chute inside cavity (114) from outside of the chute channel (110). In some embodiments, the inspection window may comprise a window panel that can be opened, or a transparent material.

In some embodiments, gaps (152) between the wear plates (151) are located at each flush butt joint connection (118) of the edge flanges (140). In some embodiments, the gaps (152) may be about ¼ inch wide, or about ½ inch wide, or about ¾ inch wide. In other embodiments, the gaps (152) are 1 inch wide or greater.

Figure 4:
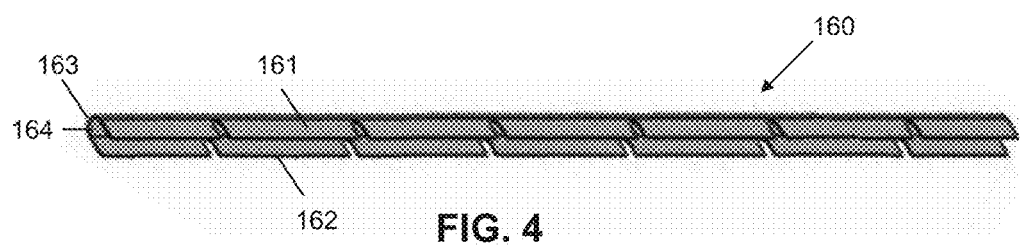
FIG. 4 shows a non-limiting embodiment of a dust cap.

As shown in FIG. 4, a fugitive dust cap (160) may be disposed on a flush butt joint connection (118). In some embodiments, the fugitive dust cap (160) comprises a shape of a "U" in a cross-section having a cap first leg (161) and a cap second leg (162) connected by a cap middle leg (163) to form a channel (164). The cap first leg (161) may be interfacingly disposed on the chute top flange (116) and the cap second leg (162) may be interfacingly disposed on the chute bottom flange (117) with the cap middle leg (163) interfacingly covering the flush butt joint connection (118), thereby minimizing fugitive dust from the flush butt joint connection (118). In some embodiments, the fugitive dust cap (160) comprises a sealing material disposed in the channel (164). Example of the sealing material include, but are not limited to, fiberglass, rubber, Teflon™, plastic, foam, or cloth.

In other embodiments, an angle mount (170) is located on an outside of the chute channel (110) for securely mounting the modular chute system (100) to an external support. In one embodiment, the external support is a platform. In another embodiment, the external support is scaffolding.

In some embodiments, a panel removal tool includes a mounting block (1173) that is adjacently mounted to the panel edge (125). In some embodiments, a mounting block is adjacently mounted at an intersection of two panel edges (125). In some embodiments, the mounting block (1173) is a T-slot block. In some embodiments, a T-slot nut (1174) is slidably placed in the T-slot block. In some embodiments, a hold down fastener (1180) is threadably interested into the T-slot nut. In some embodiments, a block (1175) comprising a threaded aperture (1176) and a non-threaded slot (1178) is pivotally attached to the mounting block. In some embodiments, a jack screw (1177) is threadably inserted into the threaded aperture (1176) and rotated entirely through the threaded aperture to interfaceably contact the mounting block (1173) to apply pivoting pressure to the mounting block. In some embodiments, the structural panel (120) is removed via pressure applied via the panel removal tool.

In some embodiments, the block of the panel removal tool can be used in a reverse manner as a panel insertion tool.

In some embodiments, a scaffolding system includes a mounting block (1173) that is adjacently mounted to the panel edge (125). In some embodiments, a mounting block (1173) is adjacently mounted at an intersection of two panel edges (125). In some embodiments, the mounting block (1173) is a T-slot block. In some embodiments, a T-slot nut (1174) is slidably placed in the T-slot block. In some embodiments, a hold down fastener (1180) is threadably interested into the T-slot nut. In some embodiments, some embodiments, the mounting block (1173) comprises an internally threaded aperture (1176) for mounting an external attachment. In some embodiments, a scaffold clip (1179) is mounted to a mounting block (1173) via the threaded aperture (1176) and a threaded fastener (1180). In some embodiments, a scaffold clip (1179) comprises a linear angle iron component having one or more unthreaded apertures located in a flat horizontal component (1181) and one or more unthreaded apertures located in a flat vertical component (1182) for mounting to the mounting block via the threaded fastener.

In some embodiments, a scaffold base component (1183) comprises a horizontal floor member (1184) and an angled support member (1185) angularly attached at a terminating distal end. In some embodiments, a proximal end of the floor member (1184) hooks into the unthreaded aperture on the horizontal component. In some embodiments, a proximal end of the angled support member rests against the structural panel (120). In some embodiments, a proximal end of the angled support member rests against the mounting block. In some embodiments, a hook (1186) is located on the proximal end of the floor member (1184). In some embodiments, a rest (1187) is located on the proximal end of the support member. In some embodiments, a vertical support (1188) is connected to the proximal end of the support member and the proximal end of the floor member. In some embodiments, an attachment tab (1189) having an aperture (150) located therein is located on a top side of the floor member for attaching rails thereto.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A modular chute system (100) for providing convenient access to a chute inside cavity (114) of a chute channel (110) in the system (100) from a variety of locations to enhance serviceability, wherein the system (100) comprises the chute channel (110) formed from a plurality of hollow chute sections (115), wherein the chute channel (110) comprises:
   a. an open chute top (111);
   b. an open chute bottom (112);
   c. the chute inside cavity (114) disposed between and fluidly joining the chute top (111) and the chute bottom (112); and
   d. the plurality of hollow chute sections (115), each hollow chute section (115) formed from a plurality of rigid structural panels (120), each structural panel (120) comprising:
      i. a panel interior surface (130);
      ii. a panel exterior surface (131); and
      iii. at least three panel edges, hereinafter collectively referred to as panel edges (125), wherein the panel edges (125) combine to form a panel outer periphery (126), wherein an edge flange (140) is disposed on each panel edge (125) encompassing the entire panel outer periphery (126), wherein the edge flange (140) projects out and away from the panel exterior surface (131) at an angle Θ,
   wherein the plurality of rigid structural panels (120) are connected in succession by consecutively adjoining the edge flange (140) of each structural panel (120) to the edge flange (140) of another structural panel (120) at a flush butt joint connection (118), and adjoining the edge flange (140) of a final structural panel (120) to the edge flange (140) of an initial structural panel (120) at a flush butt joint connection (118), thereby forming each hollow chute section (115),
   wherein the edge flange (140) disposed on the panel edge of each structural panel (120) and proximal to the chute top (111) collectively forms a chute top flange (116) of each hollow chute section (115), wherein the edge flange (140) disposed on the panel of each structural panel (120) and proximal to the chute bottom (112) collectively forms a chute bottom flange (117) of each hollow chute section (115),
   wherein the plurality of hollow chute sections (115) are connected by consecutively adjoining the chute bottom flange (117) of each hollow chute section (115) to the chute top flange (116) of another hollow chute section (115) at a flush butt joint connection (118), thereby forming the chute channel (110), wherein every structural panel edge flange (140) that joins another structural panel edge flange (140) is a flush butt joint connection (118),
   wherein such an arrangement of the chute channel (110) results in a plurality of flush butt joint connections (118) disposed throughout the chute channel (110) at each structural panel edge flange (140) meeting with another structural panel edge flange (140), wherein each flush butt joint connection (118) is a vertical flush butt joint connection, a horizontal flush butt joint connection, or a diagonal flush butt joint connection,
   whereupon removal of any single structural panel (120) from any hollow chute section (115) provides convenient access to the chute inside cavity (114), wherein the chute channel (110) is self-supporting and non-collapsing upon removal of any single structural panel (120).

2. The system (100) of claim 1 further comprising a plurality of chute channels (110) fluidly connected to each other to form the system (100).

3. The system (100) of claim 1, wherein Θ ranges from about 30° to about 135°.

4. The system (100) of claim 1, wherein the structural panels (120) are constructed from ferrous or non-ferrous materials.

5. The system (100) of claim 1, wherein the edge flange (140) is constructed from ferrous or non-ferrous materials.

6. The system (100) of claim 1, wherein a first row of structural panels (120) of one chute section (115) is disposed on a second row of structural panels (120) of another chute section (115) in an offset manner such that a vertical seam of the first row of structural panels (120) is misaligned with a vertical seam of the second row of structural panels (120).

7. The system (100) of claim 1, wherein a first row of structural panels (120) of one chute section (115) is disposed on a second row of structural panels (120) of another chute section (115) in an aligned manner such that vertical seams of the first row of structural panels (120) are aligned with vertical seams of the second row of structural panels (120).

8. The system (100) of claim 1, wherein for each chute section (115), the plurality of structural panels (120) ranges from about 3 to 30 structural panels.

9. The system (100) of claim 1, wherein the panel interior surface (130) is covered with a protective liner (155).

10. The system (100) of claim 9, wherein the protective liner (155) is constructed from a material selected from a group consisting of a ceramic material, an abrasion-resistant material, a polymer material, and a rubber material.

11. The system (100) of claim 1, wherein each chute section (115) has three or four section corners (145), wherein each chute section corner (145) has an interior angle ranging from about 15°-90°.

12. The system (100) of claim 11, wherein each chute section corner (145) is formed by a single structural panel that is a corner panel such that said corner panel is bent to form the interior angle of the chute section corner.

13. The system (100) of claim 11, wherein each chute section corner (145) is formed by two structural panels having their adjoining edge flange (140) bent so as to form the interior angle of the chute section corner.

14. The system (100) of claim 1, wherein an aperture (150) is disposed through the structural panel (120) from the panel interior surface (130) to the panel exterior surface (131), wherein the aperture (150) is adapted for use for mounting a wear plate (151).

15. The system (100) of claim 14, wherein the wear plate (151) is disposed on the panel interior surface (130) for covering the panel interior surface (130).

16. The system (100) of claim 14, wherein the wear plate (151) is constructed from a metal, a ceramic, a polymer, or an abrasion resistant material.

17. A modular chute system (100) for providing convenient access to a chute inside cavity (114) of a chute channel (110) in the system (100) from a variety of locations to enhance serviceability, wherein the system (100) comprises the chute channel (110) formed from a plurality of hollow chute sections (115), wherein the chute channel (110) comprises:

a. an open chute top (111);
b. an open chute bottom (112);
c. the chute inside cavity (114) disposed between and fluidly joining the chute top (111) and the chute bottom (112); and
d. the plurality of hollow chute sections (115), each hollow chute section (115) formed from a plurality of rigid structural panels (120), each structural panel (120) comprising:
  i. a panel interior surface (130);
  ii. a panel exterior surface (131); and
  iii. at least three panel edges, hereinafter collectively referred to as panel edges (125), wherein the panel edges (125) combine to form a panel outer periphery (126), wherein an edge flange (140) is disposed on each panel edge (125) encompassing the entire panel outer periphery (126), wherein the edge flange (140) projects out and away from the panel exterior surface (131) at an angle Θ, wherein the plurality of rigid structural panels (120) are connected in succession by consecutively adjoining the edge flange (140) of each structural panel (120) to the edge flange (140) of another structural panel (120) at a flush butt joint connection (118), and adjoining the edge flange (140) of a final structural panel (120) to the edge flange (140) of an initial structural panel (120) at a flush butt joint connection (118), thereby forming each hollow chute section (115), wherein the edge flange (140) disposed on the panel edge of each structural panel (120) and proximal to the chute top (111) collectively forms a chute top flange (116) of each hollow chute section (115), wherein the edge flange (140) disposed on the panel of each structural panel (120) and proximal to the chute bottom (112) collectively forms a chute bottom flange (117) of each hollow chute section (115), wherein the plurality of hollow chute sections (115) are connected by consecutively adjoining the chute bottom flange (117) of each hollow chute section (115) to the chute top flange (116) of another hollow chute section (115) at a flush butt joint connection (118), thereby forming the chute channel (110), wherein every structural panel edge flange (140) that joins another structural panel edge flange (140) is a flush butt joint connection (118), wherein such an arrangement of the chute channel (110) results in a plurality of flush butt joint connections (118) disposed throughout the chute channel (110) at each structural panel edge flange (140) meeting with another structural panel edge flange (140), wherein each flush butt joint connection (118) is a vertical flush butt joint connection, a horizontal flush butt joint connection, or a diagonal flush butt joint connection, wherein each chute section (115) has at least five section corners (145), wherein each chute section corner (145) has an interior angle of 90° or greater than 90°, whereupon removal of any single structural panel (120) from any hollow chute section (115) provides convenient access to the chute inside cavity (114), wherein the chute channel (110) is self-supporting and non-collapsing upon removal of any single structural panel (120).

18. The system (100) of claim 17, wherein each chute section corner (145) is formed by a single structural panel that is a corner panel such that said corner panel is bent to form the interior angle of the chute section corner.

19. The system (100) of claim 17, wherein each chute section corner (145) is formed by two structural panels having their adjoining edge flange (140) bent so as to form the interior angle of the chute section corner.

20. A modular chute system (100) for providing convenient access to a chute inside cavity (114) of a chute channel (110) in the system (100) from a variety of locations to enhance serviceability, wherein the system (100) comprises the chute channel (110) comprising a plurality of rigid structural panels (120), each structural panel (120) comprising:

a. a panel interior surface (130);
b. a panel exterior surface (131);
c. at least three panel edges, hereinafter collectively referred to as panel edges (125), wherein the panel edges (125) combine to form a panel outer periphery (126); and
d. an edge flange (140) disposed on each panel edge (125) encompassing the entire panel outer periphery (126), wherein the edge flange (140) projects out and away from the panel exterior surface (131) at an angle Θ ranging from about 30° to about 135°, wherein the plurality of rigid structural panels (120) are connected by consecutively adjoining the edge flange (140) of each structural panel (120) to the edge flange (140) of another structural panel (120) at a flush butt joint connection (118) such that the plurality of connected structural panels (120) form an enclosed hollow structure, wherein said enclosed hollow structure forms the chute channel (110), wherein a hollow interior of the enclosed hollow structure forms a chute inside cavity (114) disposed between and fluidly joining a first opening and a second opening of the chute channel (110); and wherein such an arrangement of the chute channel (110) results in a plurality of flush butt joint connections (118) disposed throughout the chute channel (110) at each structural panel edge flange (140) meeting with another structural panel edge flange (140), wherein each flush butt joint connection (118) is a vertical flush butt joint connection, a horizontal flush butt joint connection, or a diagonal flush butt joint connection, whereupon removal of any single structural panel (120) from the chute channel (110 provides convenient access to the chute inside cavity (114), wherein the chute channel (110) is self-supporting and non-collapsing upon removal of any single structural panel (120).

* * * * *